US012405656B2

United States Patent
Chen

(10) Patent No.: US 12,405,656 B2
(45) Date of Patent: Sep. 2, 2025

(54) POWER CONTROL METHOD FOR MICROCONTROLLER UNIT AND POWER CONTROL SYSTEM USING THE SAME

(71) Applicant: NUVOTON TECHNOLOGY CORPORATION, Hsinchu (TW)

(72) Inventor: I-Ching Chen, Zhubei (TW)

(73) Assignee: NUVOTON TECHNOLOGY CORPORATION, Hsinchu (TW)

( * ) Notice: Subject to any disclaimer, the term of this patent is extended or adjusted under 35 U.S.C. 154(b) by 75 days.

(21) Appl. No.: 18/594,273

(22) Filed: Mar. 4, 2024

(65) Prior Publication Data

US 2025/0155954 A1     May 15, 2025

(30) Foreign Application Priority Data

Nov. 10, 2023    (TW) ................................. 112143419

(51) Int. Cl.
| | | |
|---|---|---|
| *G06F 1/324* | (2019.01) | |
| *G06F 1/08* | (2006.01) | |
| *G06F 1/3234* | (2019.01) | |
| *G06F 1/3296* | (2019.01) | |

(52) U.S. Cl.
CPC ............ *G06F 1/324* (2013.01); *G06F 1/3296* (2013.01)

(58) Field of Classification Search
CPC ....... G06F 1/324; G06F 1/3296; G06F 1/3203
See application file for complete search history.

(56) References Cited

U.S. PATENT DOCUMENTS

| | | | |
|---|---|---|---|
| 10,998,910 B1* | 5/2021 | Rosen | H03L 7/0996 |
| 2016/0246363 A1* | 8/2016 | Chen | G06F 1/28 |
| 2018/0113502 A1* | 4/2018 | Raja | G06F 15/7807 |
| 2020/0195184 A1* | 6/2020 | Meng | G01R 35/00 |

\* cited by examiner

*Primary Examiner* — Jaweed A Abbaszadeh
*Assistant Examiner* — Gayathri Sampath
(74) *Attorney, Agent, or Firm* — MUNCY, GEISSLER, OLDS & LOWE, P.C.

(57) ABSTRACT

The present disclosure provides a power control method for a microcontroller unit (MCU) and a power control system using the same. The power control method includes after a triggering event of switching CPU frequency occurs, controlling, through a power controller, a low dropout linear regulator (LDO) to output a preset voltage and triggering a clock controller to switch a first central processing unit (CPU) frequency; after the clock controller switches the first CPU frequency, counting, through a clock counter, a number of times of occurrence of a CPU clock within a period to obtain a second CPU frequency; and determining, through the power controller, a corresponding voltage of the second CPU frequency and controlling the LDO to output the corresponding voltage.

10 Claims, 4 Drawing Sheets

POWER CONTROL METHOD FOR MICROCONTROLLER UNIT AND POWER CONTROL SYSTEM USING THE SAME

CROSS-REFERENCE TO RELATED APPLICATION

This application claims the priority from the TW Patent Application No. 112143419, filed on Nov. 10, 2023, and all contents of such TW patent application are comprised in the present disclosure.

BACKGROUND

1. Field of the Invention

The present disclosure relates to power control technologies, in particular to, a power control method for a microcontroller unit (MCU) and a power control system using the same.

2. Description of the Related Art

Portable devices (e.g., smartphones, tablets, etc.) powered by batteries may apply microcontroller units (MCUs) for power management. In order to extend battery lifetime, power should be saved as much as possible. The internal circuit of the MCU may be powered by a low dropout linear regulator (LDO). In order to flexibly save energy, the supplied voltage (or power level) of the LDO is adjustable. For the MCU that supports multiple power modes, each power mode corresponds to a specific central processing unit (CPU) highest operating frequency (or maximum operating rate) and a specific LDO voltage. Although reducing an LDO voltage may achieve power savings, the CPU highest operating frequency supported by the lower LDO voltage is lower.

The conventional power modes are set manually through software, and the power mode correspondence of each MCU may be different (e.g., the same LDO voltage may correspond to different CPU highest operating frequencies), which may result in incorrect or suboptimal settings. When a low-power mode is set, the LDO voltage is relatively low, and setting a higher CPU operating frequency may cause the system to operate improperly. When a high-power mode is set, the LDO voltage is relatively high, and setting a lower CPU operating frequency may cause unnecessary power consumption.

Thus, how to effectively control the operating power of the MCU is a problem to be solved.

SUMMARY

In order to solve the above technical problems, the present disclosure provides a power control method for a microcontroller unit (MCU) and a power control system using the same to (1) avoid setting power modes manually through software and (2) avoid incorrect power settings.

Embodiments of the present disclosure provide a power control method for an MCU, including: after a triggering event of switching central processing unit (CPU) frequency occurs, controlling, through a power controller, a low dropout linear regulator (LDO) to output a preset voltage and triggering a clock controller to switch a first CPU frequency; after the clock controller switches the first CPU frequency, counting, through a clock counter, a number of times of occurrence of a CPU clock within a period to obtain a second CPU frequency; and determining, through the power controller, a corresponding voltage of the second CPU frequency and controlling the LDO to output the corresponding voltage.

Optionally, determining the corresponding voltage of the second CPU frequency includes substituting, through the power controller, the second CPU frequency into a non-decreasing function to obtain the corresponding voltage, wherein the non-decreasing function includes at least one of a step function and an increasing continuous function.

Optionally, counting the number of times of occurrence of the CPU clock within the period includes counting, through the power controller, the number of times of occurrence of the CPU clock within the period according to a high internal RC oscillator (HIRC) clock, wherein a time length of the period is associated with a frequency of the HIRC clock.

Optionally, the preset voltage is a highest voltage supported by the MCU.

Optionally, the triggering event of switching CPU frequency includes: at least one of an instruction to switch a CPU clock source and an instruction to divide frequency is received.

Embodiments of the present disclosure provide a power control system for an MCU, including: a clock counter, electrically connected to a clock controller, for: after the clock controller switches a first CPU frequency, counting a number of times of occurrence of a CPU clock within a period to obtain a second CPU frequency; and a power controller, electrically connected to the clock counter, the clock controller, and an LDO, for: after a triggering event of switching CPU frequency occurs, controlling the LDO to output a preset voltage and triggering the clock controller to switch the first CPU frequency; and determining a corresponding voltage of the second CPU frequency and controlling the LDO to output the corresponding voltage.

Based on the above, the power control method for the MCU and the power control system using the same provided by the present disclosure obtain the CPU operating frequency and adjust the appropriate LDO voltage for LDO output based on the obtained CPU operating frequency. In short, the LDO voltage (or power level) may be controlled automatically through hardware. Thus, besides eliminating the need for additional setting manually through software, it may prevent incorrect settings that lead to abnormal system operation or unnecessary power consumption. Additionally, it may provide more and finer adjustments of the LDO voltage for the CPU operating frequencies.

BRIEF DESCRIPTION OF THE DRAWINGS

The drawings are provided to make the persons with ordinary knowledge in the field of the art further understand the present disclosure, and are incorporated into and constitute a part of the specification of the present disclosure. The drawings illustrate demonstrated embodiments of the present disclosure, and are used to explain the principal of the present disclosure together with the description of the present disclosure.

DESCRIPTION OF THE PREFERRED EMBODIMENTS

Figure 1:
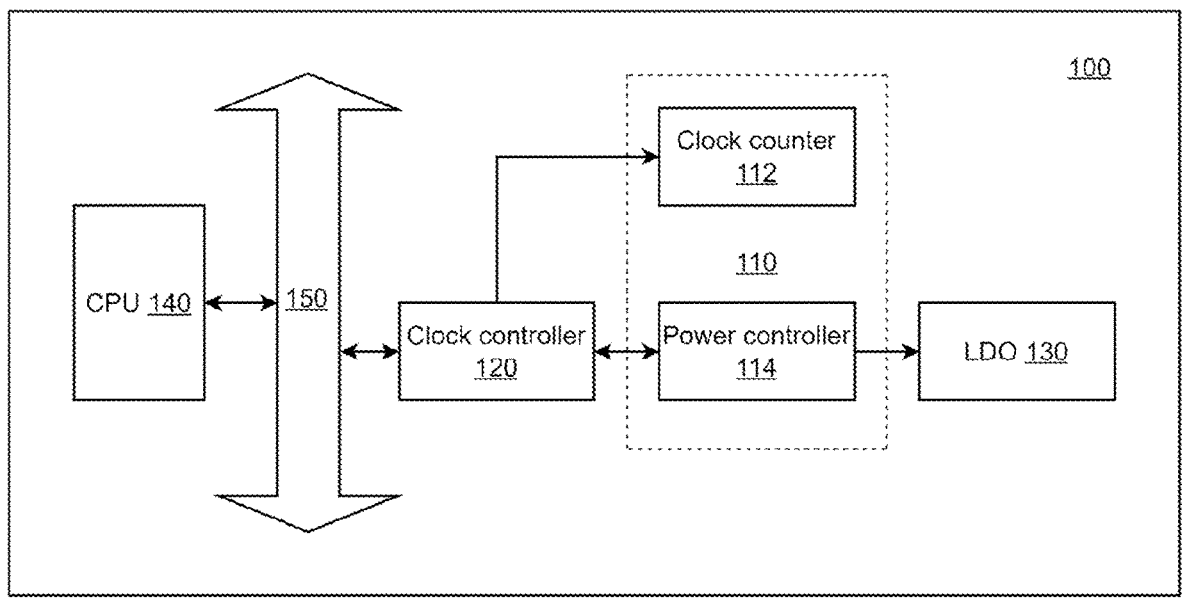
FIG. 1 is a schematic block diagram of a power control system for a microcontroller unit (MCU) according to an embodiment of the present disclosure.
Figure 2A:
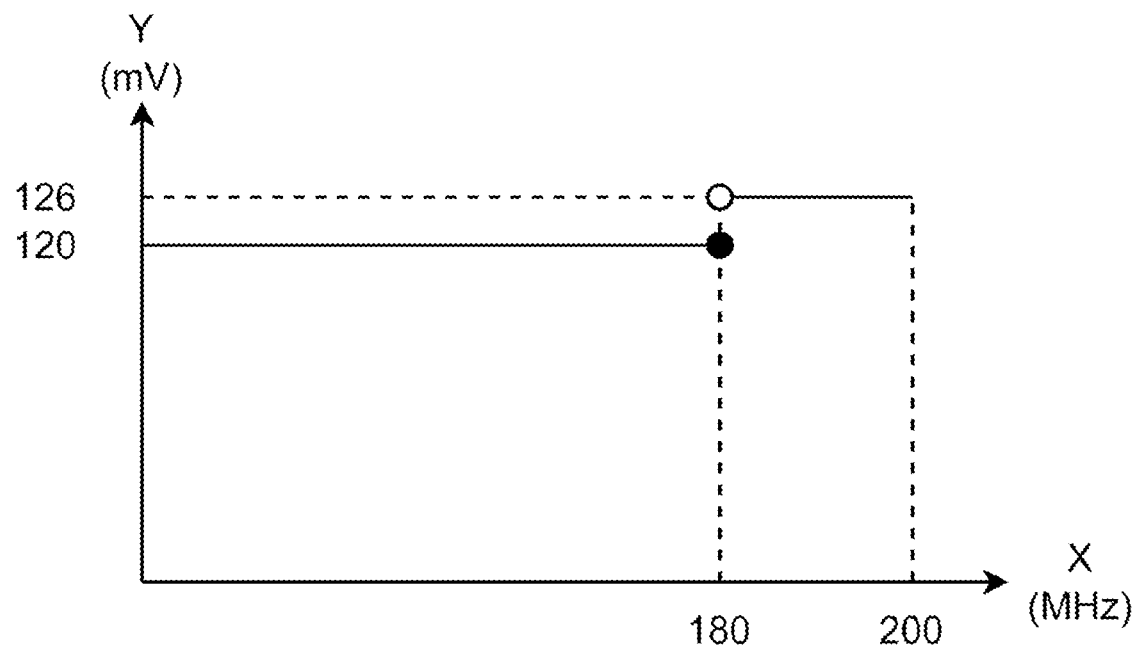
FIGS. 2A to 2D are schematic function diagrams of a power control method for an MCU according to embodiments of the present disclosure.
Figure 2B:
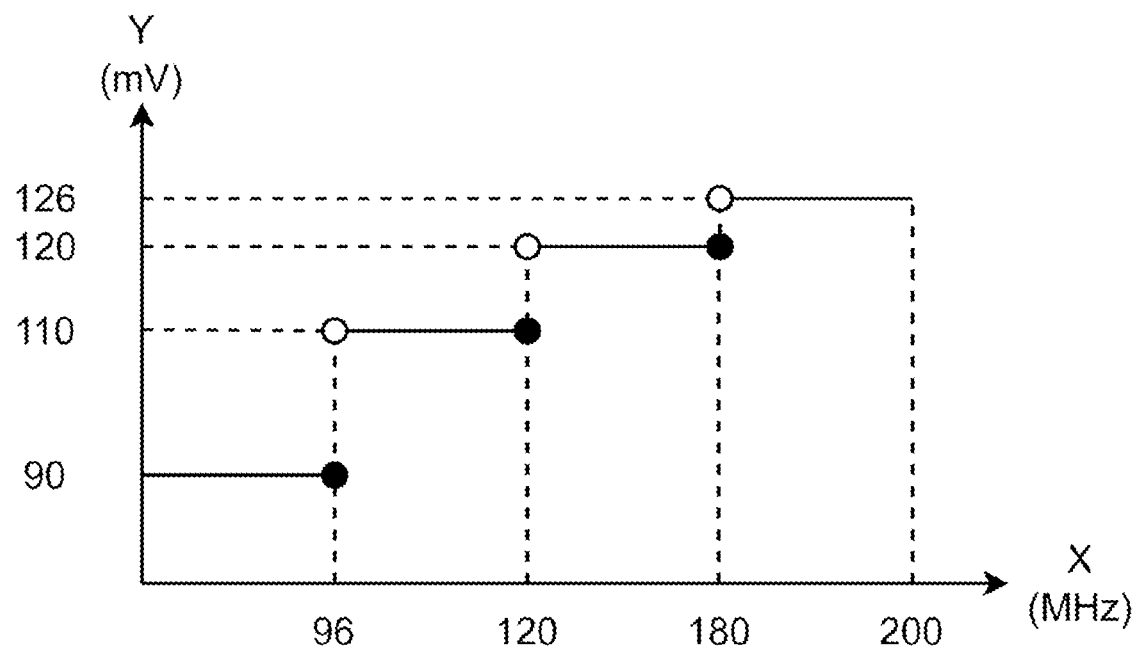
Figure 2C:
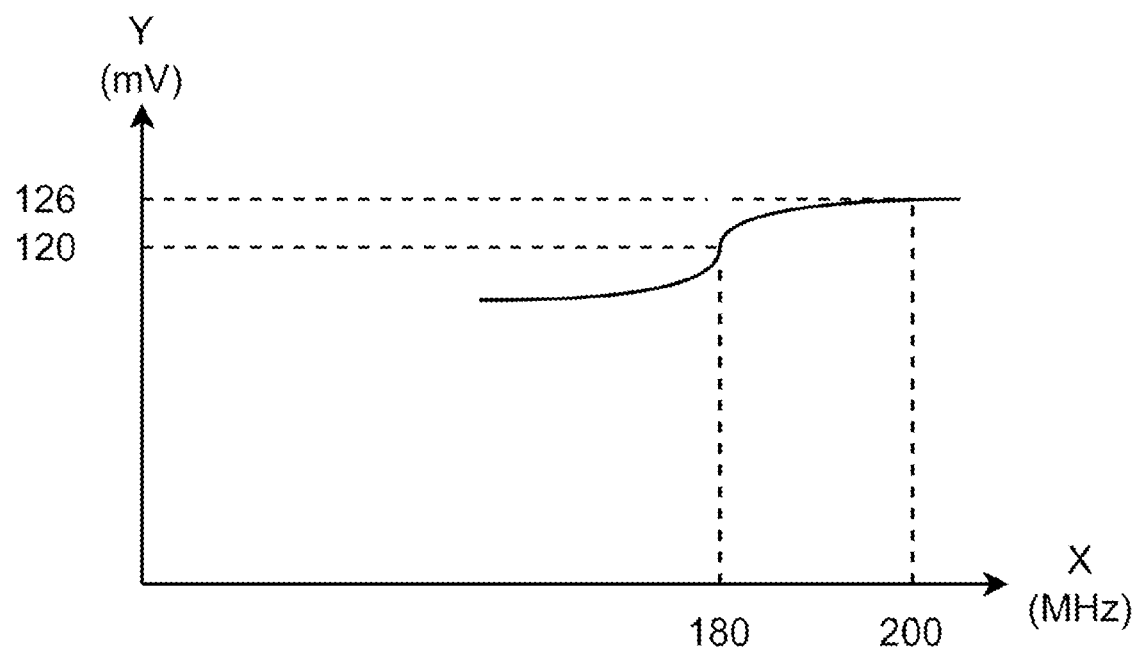
Figure 2D:
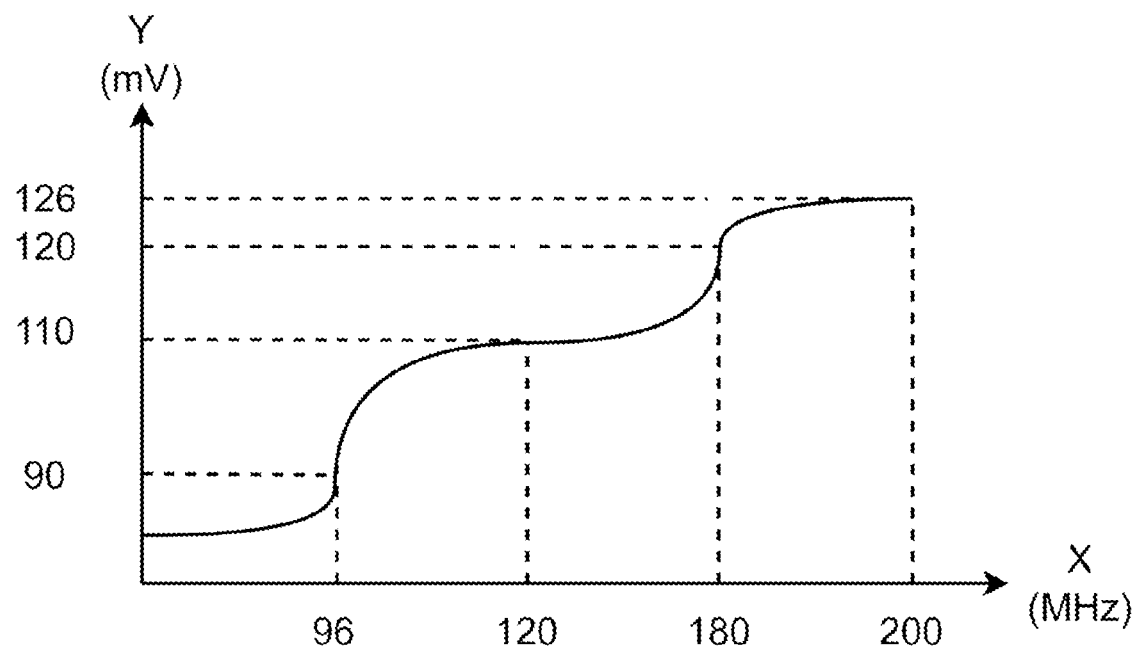

To address the above technical problems, embodiments of the present disclosure provide a power control method for a microcontroller unit (MCU) and a power control system using the same. Reference will now be made in detail to exemplary embodiments of the present disclosure, which will be illustrated in the accompanying drawings. Where possible, the same reference symbols are used in the drawings and the description to refer to the same or similar components. In addition, the implementation of the exemplary embodiment is only one of the realization ways of the design concept of the present disclosure, and the following examples are not intended to limit the present disclosure.

FIG. 1 is a schematic block diagram of a power control system for an MCU according to an embodiment of the present disclosure. Please refer to FIG. 1, a power control system 110 for an MCU 100 includes a clock counter 112 and a power controller 114. The clock counter 112 is electrically connected to a clock controller 120. The power controller 114 is electrically connected to the clock counter 112, the clock controller 120, and a low dropout regulator (LDO) 130. The clock controller 120 may be electrically connected to a bus (e.g., AHB BUS) 150. The bus 150 may be electrically connected to a central processing unit (CPU) 140. It should be noted that although the regulator is exemplified by the LDO, the present disclosure is not limited thereto.

After a triggering event of switching CPU frequency occurs, the power controller 114 controls the LDO 130 to output a preset voltage and triggers the clock controller 120 to switch a first CPU frequency (e.g., current operating frequency). After the clock controller 120 switches the first CPU frequency, the clock counter 112 counts a number of times of occurrence of a CPU clock within a period to obtain a second CPU frequency (e.g., target operating frequency or a frequency close to the target operating frequency). The power controller 114 determines a corresponding voltage of the second CPU frequency and controls the LDO 130 to output the corresponding voltage. That is, it first obtains the CPU operating frequency and then adjusts the appropriate LDO voltage for LDO output based on the obtained CPU operating frequency. In other words, the LDO voltage (or power level) is controlled/adjusted automatically through hardware. It should be noted that the first CPU frequency and the second CPU frequency may refer to the frequencies in which the CPU 140 operates and can be interchangeably used with the system frequencies, and the present disclosure is not limited thereto.

In some embodiments, the power controller 114 may substitute the second CPU frequency into a non-decreasing function to obtain the corresponding voltage. The non-decreasing function may include at least one of a step function and an increasing continuous function. The non-decreasing function may be obtained from simulation results during the development stage of the MCU. That is, the CPU operating frequency serves as the input value X for the function, and the LDO voltage serves as the output value Y for the function. FIGS. 2A to 2D are schematic function diagrams of a power control method for an MCU according to embodiments of the present disclosure. Please refer to FIG. 2A, the non-decreasing function may be a step function. Please refer to FIG. 2B, the non-decreasing function may be a combination of multiple piecewise step functions. Please refer to FIG. 2C, the non-decreasing function may be an increasing continuous function, which may be, for example, expressed as $Y=a*\tan h(X-b)+c$. The parameters (a, b, c) may be fixed values or adjustable values (e.g., through Config or ROMMAP). Please refer to FIG. 2D, the non-decreasing function may be a combination of multiple piecewise increasing continuous functions. It should be noted that the above schematic function diagrams are exemplary embodiments, and the present disclosure is not limited thereto. For example, the non-decreasing function may be a combination of step function(s) and increasing continuous function(s).

In some embodiments, the clock controller 112 may count the number of times of occurrence of the CPU clock within the period according to a high internal RC oscillator (HIRC) clock. A time length of the period is associated with (e.g., inversely proportional to) a frequency of the HIRC clock. For example, the time length of the period is 83.3 ns when counting using an HIRC clock with a frequency of 12 MHz. It should be noted that if the CPU clock cannot be counted (or the second CPU frequency cannot be obtained), it indicates that the frequency of the CPU clock is lower than the frequency of the HIRC clock. It should also be noted that although the oscillator is exemplified by the HIRC, the present disclosure is not limited thereto.

In some embodiments, the preset voltage may be a highest voltage supported by the MCU 100. That is, in situations where the target frequency of the CPU may be unknown, the power controller 114 controls the LDO 130 to output the highest voltage applicable to all CPU operating frequencies. It should be noted that setting the highest voltage consumes more power but allows for a downward adjustment once the corresponding voltage is determined. In contrast, setting a lower voltage conserves power but may result in the inability to perform an upward adjustment.

In some embodiments, the triggering event of switching CPU frequency includes at least one of an instruction to switch a CPU clock source and an instruction to divide frequency is received (e.g., by the clock controller 120). For example, software may first set the CPU target frequency (e.g., switch to the CPU clock). After the power controller 114 controls the LDO 130 to output the preset voltage, hardware (e.g., including the clock controller, power controller, etc.) can actually switch to the CPU target frequency.

In some embodiments, after controlling the LDO 130 to output the preset voltage, the power controller 114 may trigger the clock controller to switch the first CPU frequency.

In some embodiments, after the triggering event of switching CPU frequency occurs, the power controller 114 may receive a first triggering signal from the clock controller 120. The first triggering signal may trigger the power controller 114 to control the LDO 130 to output the preset voltage and trigger the clock controller 120 to switch the first CPU frequency.

In some embodiments, after controlling the LDO 130 to output the preset voltage, the power controller 114 may transmit a switch notification to the clock controller 120. The switch notification may trigger the clock controller 120 to switch from the first CPU frequency to the CPU target frequency (e.g., equal to the second CPU frequency).

In some embodiments, after the clock controller 120 switches the first CPU frequency, the clock counter 112 may receive a second triggering signal from the clock controller 120. The second triggering signal may trigger the clock counter 112 to count the number of times of occurrence of the CPU clock within the period.

Figure 3:
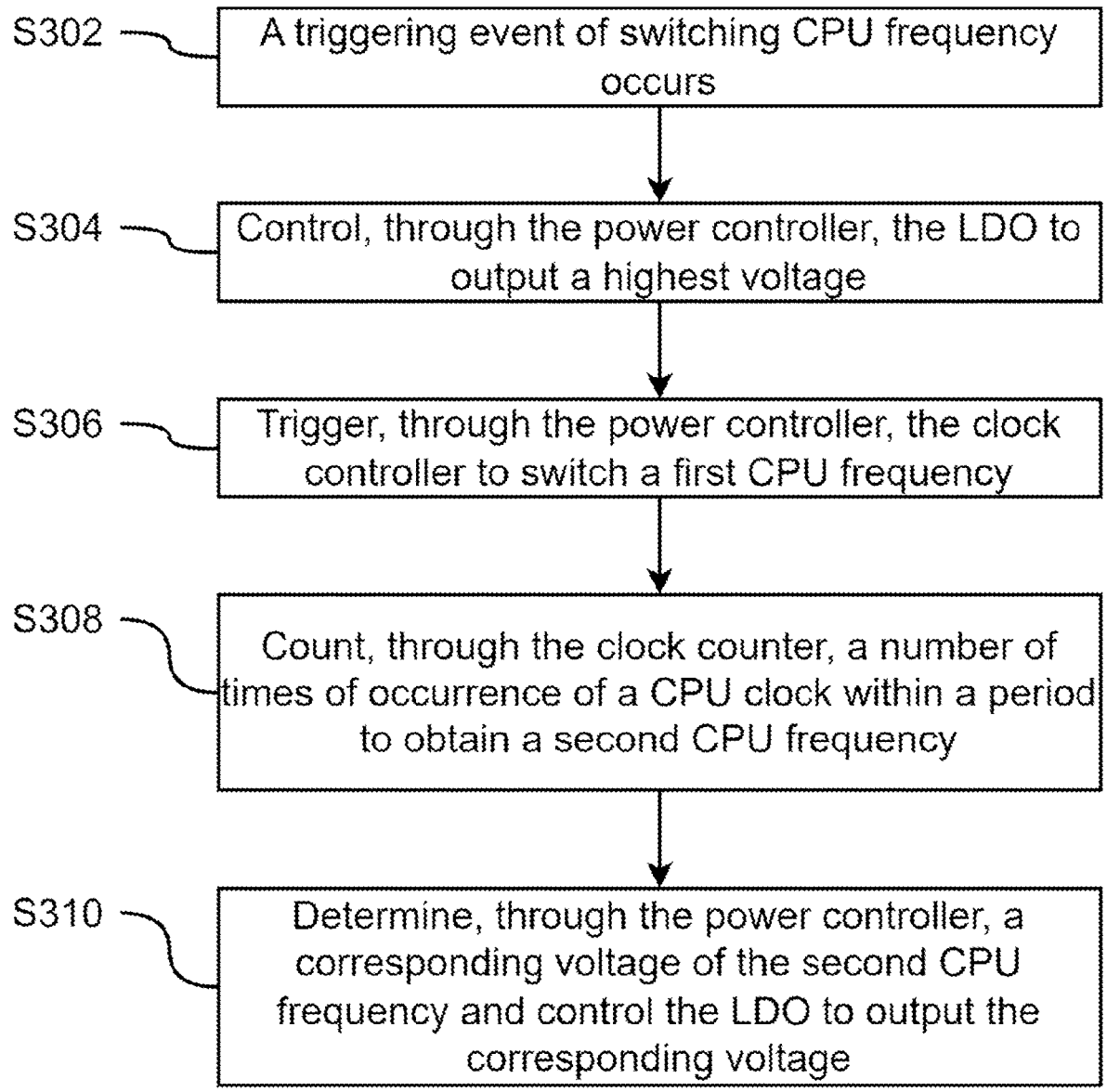
FIG. 3 is a schematic flowchart diagram of a power control method for an MCU according to an embodiment of the present disclosure.

According to the above embodiments, the following power control method can be obtained (e.g., summarized). FIG. 3 is a schematic flowchart diagram of a power control method for an MCU according to an embodiment of the present disclosure. Please refer to FIG. 3, the power control method includes the following steps:

Step S302: A triggering event of switching CPU frequency occurs.

Step S304: Control, through the power controller, the LDO to output a highest voltage.

Step S306: Trigger, through the power controller, the clock controller to switch a first CPU frequency.

Step S308: Count, through the clock counter, a number of times of occurrence of a CPU clock within a period to obtain a second CPU frequency.

Step S310: Determine, through the power controller, a corresponding voltage of the second CPU frequency and control the LDO to output the corresponding voltage.

To sum up, the power control method for the MCU and the power control system using the same provided by the present disclosure obtain the CPU operating frequency and adjust the appropriate LDO voltage for LDO output based on the obtained CPU operating frequency. In short, the LDO voltage (or power level) may be controlled automatically through hardware. Thus, besides eliminating the need for additional setting manually through software, it may prevent incorrect settings that lead to abnormal system operation or unnecessary power consumption. Additionally, it may provide more and finer adjustments of the LDO voltage for the CPU operating frequencies.

It should be understood that the examples and the embodiments described herein are for illustrative purpose only, and various modifications or changes in view of them will be suggested to those skilled in the art, and will be comprised in the spirit and scope of the application and the appendix with the scope of the claims.

What is claimed is:

1. A power control method for a microcontroller unit (MCU), comprising:
    after a triggering event of switching central processing unit (CPU) frequency occurs, controlling, through a power controller, a low dropout linear regulator (LDO) to output a preset voltage and triggering a clock controller to switch a first CPU frequency;
    after the clock controller switches the first CPU frequency, counting, through a clock counter, a number of times of occurrence of a CPU clock within a period to obtain a second CPU frequency; and
    determining, through the power controller, a corresponding voltage of the second CPU frequency and controlling the LDO to output the corresponding voltage.

2. The power control method according to the claim 1, wherein determining the corresponding voltage of the second CPU frequency comprises substituting, through the power controller, the second CPU frequency into a non-decreasing function to obtain the corresponding voltage, wherein the non-decreasing function comprises at least one of a step function and an increasing continuous function.

3. The power control method according to the claim 1, wherein counting the number of times of occurrence of the CPU clock within the period comprises counting, through the power controller, the number of times of occurrence of the CPU clock within the period according to a high internal RC oscillator (HIRC) clock, wherein a time length of the period is associated with a frequency of the HIRC clock.

4. The power control method according to the claim 1, wherein the preset voltage is a highest voltage supported by the MCU.

5. The power control method according to the claim 1, wherein the triggering event of switching CPU frequency comprises: at least one of an instruction to switch a CPU clock source and an instruction to divide frequency is received.

6. A power control system for a microcontroller unit (MCU), comprising:
    a clock counter, electrically connected to a clock controller, for:
        after the clock controller switches a first central processing unit (CPU) frequency, counting a number of times of occurrence of a CPU clock within a period to obtain a second CPU frequency; and
    a power controller, electrically connected to the clock counter, the clock controller, and a low dropout linear regulator (LDO), for:
        after a triggering event of switching CPU frequency occurs, controlling the LDO to output a preset voltage and triggering the clock controller to switch the first CPU frequency; and
        determining a corresponding voltage of the second CPU frequency and controlling the LDO to output the corresponding voltage.

7. The power control system according to the claim 6, wherein the power controller substitutes the second CPU frequency into a non-decreasing function to obtain the corresponding voltage, wherein the non-decreasing function comprises at least one of a step function and an increasing continuous function.

8. The power control system according to the claim 6, wherein the clock counter counts, according to a high internal RC oscillator (HIRC) clock, the number of times of occurrence of the CPU clock within the period, wherein a time length of the period is associated with a frequency of the HIRC clock.

9. The power control system according to the claim 6, wherein the preset voltage is a highest voltage supported by the MCU.

10. The power control system according to the claim 6, wherein the triggering event of switching CPU frequency comprises: at least one of an instruction to switch a CPU clock source and an instruction to divide frequency is received.

* * * * *